(12) United States Patent
Subramanian et al.

(10) Patent No.: US 10,318,207 B1
(45) Date of Patent: Jun. 11, 2019

(54) APPARATUS AND METHODS FOR INTER-VERSION REPLICATION CHECKING

(71) Applicant: EMC IP Holding Company LLC, Hopkinton, MA (US)

(72) Inventors: Vasu Subramanian, Chapel Hill, NC (US); Qi Qu, Shanghai (CN); Zheng He, Shanghai (CN); Yuanyang Wu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 104 days.

(21) Appl. No.: 15/498,822

(22) Filed: Apr. 27, 2017

(51) Int. Cl.
*G06F 3/06* (2006.01)

(52) U.S. Cl.
CPC ............ *G06F 3/065* (2013.01); *G06F 3/0604* (2013.01); *G06F 3/0634* (2013.01); *G06F 3/0683* (2013.01)

(58) Field of Classification Search
CPC ...... G06F 3/065; G06F 3/067; G06F 11/1458; G06F 11/1662; G06F 3/0604; G06F 3/0634; G06F 3/0683; H04L 41/0896; H04L 41/50; H04L 43/0876
USPC .......................................................... 711/165
See application file for complete search history.

(56) References Cited

U.S. PATENT DOCUMENTS

| 8,627,446 | B1 | | 1/2014 | Eaton et al. | |
|---|---|---|---|---|---|
| 8,819,106 | B1 | * | 8/2014 | Sirota | ..................... G06F 9/485 709/201 |
| 9,122,397 | B2 | | 9/2015 | Oliveira et al. | |
| 9,235,475 | B1 | | 1/2016 | Shilane et al. | |
| 9,798,486 | B1 | | 10/2017 | Singh | |
| 9,842,117 | B1 | | 12/2017 | Zhou et al. | |
| 2007/0168690 | A1 | * | 7/2007 | Ross | ................... G06F 11/0712 714/4.11 |
| 2007/0185973 | A1 | * | 8/2007 | Wayda | .................. G06F 3/0607 709/217 |
| 2017/0149624 | A1 | * | 5/2017 | Chitti | ...................... H04L 41/50 |
| 2017/0192817 | A1 | * | 7/2017 | Wu | ......................... G06F 9/455 |

* cited by examiner

*Primary Examiner* — Hashem Farrokh
(74) *Attorney, Agent, or Firm* — BainwoodHuang (57) ABSTRACT

Systems and methods for managing data replication between data storage resources with differing capabilities. A system can check whether capabilities of a primary data storage system are different from capabilities of a secondary data storage system. Such checking can be performed based on a release version of each of the primary and secondary data storage systems. If the capabilities of the respective data storage systems are determined to be different, then the system can make a determination as to whether or not the difference can be rectified. If the difference can be rectified, such as by enabling/disabling certain features of the primary and/or secondary data storage system, then the system can perform such a rectification and proceed with provisioning of data to be replicated. If the difference cannot be rectified, then the system can prevent the provisioning of the data and notify an administrator of the data storage systems.

17 Claims, 3 Drawing Sheets

APPARATUS AND METHODS FOR INTER-VERSION REPLICATION CHECKING

BACKGROUND

The present application relates generally to data storage systems and methods, and more specifically to systems and methods of managing a replication of data between data storage resources with differing and/or incompatible capabilities.

In recent years, activities related to creating, gathering, storing, and/or accessing computer data have become increasingly vital to commercial, academic, and governmental organizations. To protect such computer data from data storage errors, data corruption, and/or data loss due to hardware failures, software failures, and/or natural or man-made disasters, such organizations have generally implemented some level of data protection. A conventional system for implementing such data protection can employ a data storage technique known as data replication, in which an organization's data at a primary storage site are copied and stored at a secondary storage site. For example, the secondary storage site may be in the same physical location as the primary storage site, or in a physical location that is remote from the primary storage site. The conventional system can be configured to perform such data replication automatically in response to a deficiency at the primary storage site, such as reaching a low free-storage threshold, detecting a failure of an internal component, etc. In this way, a burden or opportunity for error placed on a user of the conventional system can be reduced.

SUMMARY

In accordance with the present application, systems and methods of managing a replication of data between data storage resources are disclosed that can avoid at least some of the drawbacks of conventional data replication systems and methods. As data storage system technologies have matured, particularly those implementing object-based or file-based replication using network attached storage (NAS) capabilities, the numbers and types of features available on data storage systems have generally increased with the release of each succeeding version of the data storage systems. Administrators of such data storage systems may therefore not always be certain that an organization's data will be copied from a primary storage site and stored at a secondary storage site that has capabilities compatible with those of the primary storage site. For example, the primary storage site may have archival data storage features that are not available at the secondary storage site, the secondary storage site may have a data storage capacity that is less than that of the primary storage site, etc. Allowing a replication of data between data storage resources with differing and/or incompatible capabilities can result in unwanted data storage errors, data corruption, and/or data loss.

The disclosed systems and methods of managing a replication of data between data storage resources can avoid at least some of the drawbacks of conventional data replication systems and methods by checking or otherwise determining whether capabilities of a primary data storage system at a primary storage site are different from and/or incompatible with capabilities of a secondary data storage system at a secondary storage site. Such checking or determining regarding the capabilities of the respective data storage systems can be performed at the primary storage site where provisioning of data to be replicated on the secondary data storage system is to take place. The disclosed systems and methods can make determinations regarding the capabilities of the respective data storage systems based at least on a software or hardware release version of each of the primary and secondary data storage systems. In the event the capabilities of the respective data storage systems are determined to be different and/or incompatible, the disclosed systems and methods can make a further determination as to whether or not such a difference and/or incompatibility can be rectified. In the event the difference and/or incompatibility between the capabilities of the respective data storage systems can be rectified, such as by enabling and/or disabling certain features of the primary data storage system and/or the secondary data storage system, the disclosed systems and methods can perform such a rectification of the difference and/or incompatibility and proceed with the provisioning of the data to be replicated. In the event the difference and/or incompatibility between the capabilities of the respective data storage systems cannot be rectified, the disclosed systems and methods can prevent, delay, or otherwise avert the provisioning of the data, as well as notify an administrator of the data storage systems such as by providing an error notification.

In one aspect, a system for managing a replication of data between data storage resources with differing and/or incompatible capabilities is disclosed that includes a primary data storage system disposed at a primary storage site, and a secondary data storage system disposed at a secondary storage site. The primary data storage system can include storage processing circuitry, and a data storage resource such as a data storage array. The storage processing circuitry can include at least a processor, a memory, a persistent storage, and a network interface. In an exemplary aspect, the data storage resource can be configured to implement object-based or file-based storage. The primary data storage system is communicably coupleable, via the network interface, to the secondary data storage system disposed at the secondary storage site. Like the primary data storage system, the secondary data storage system can include a data storage resource (e.g., a data storage array) configured to implement object-based or file-based storage. However, the capabilities of the secondary data storage system can be different from and/or incompatible with the capabilities of the primary data storage system. The primary data storage system is further communicably coupleable, via the network interface, to one or more host computers, each of which can be configured to operate as a web server, a file server, an e-mail server, an enterprise server, or any other suitable server or other computer.

In one mode of operation, the disclosed system for managing a replication of data between data storage resources with differing and/or incompatible capabilities can perform such data replication in response to a deficiency at the primary storage site, such as reaching a low free-storage threshold, detecting a failure of an internal component, etc. Responsive to the deficiency at the primary storage site, the disclosed system can automatically check or otherwise determine whether the capabilities of the secondary data storage system are different from and/or incompatible with the capabilities of the primary data storage system based at least on software or hardware release versions of the respective data storage systems. In an exemplary aspect, the software or hardware release version of the primary data storage system can be derived in-flight (e.g., during a pending input/output (I/O) operation) at the primary storage site from one or more attribute metadata of a storage object (e.g., a file, directory, or other data object) to be replicated, and/or from one or more attribute metadata of a parent or child object of the storage object. For example, one or more of the attribute metadata of the storage object(s) used to derive the software or hardware release version of the primary data storage system may be indicative of one or more features of the primary data storage system that are not available in the software or hardware release version of the secondary data storage system. In a further exemplary aspect, the software or hardware release version of the secondary data storage system can be obtained at the primary storage site by sending a request for such release version information to the secondary data storage system, and receiving, from the secondary data storage system, a response containing the requested release version information. Such a request and response can be initiated at the primary storage site using a predetermined web application programming interface (API), such as the representational state transfer (REST) API or any other suitable web API.

Having derived the release version of the primary data storage system and obtained the release version of the secondary data storage system, the disclosed system can make a determination as to whether or not the capabilities of the primary data storage system are different from and/or incompatible with the capabilities of the secondary data storage system based at least on the release versions of the respective data storage systems. In the event the capabilities of the respective data storage systems are determined to be different and/or incompatible, the disclosed system can make a further determination as to whether or not such a difference and/or incompatibility can be rectified, such as by enabling and/or disabling one or more features of the primary data storage system and/or the secondary data storage system. In the event the difference and/or incompatibility between the capabilities of the respective data storage systems can be rectified, the disclosed system can perform such a rectification and proceed to provision the data to be replicated on the secondary data storage system. In the event the difference and/or incompatibility between the capabilities of the respective data storage systems cannot be rectified, the disclosed system can prevent, delay, or otherwise avert the provisioning of the data, as well as notify an administrator of the data storage systems such as by providing an error notification.

It is noted that, in the cloud context, at least some electronic circuitry can be provided by remote computer resources distributed over a network. Such an electronic environment is capable of providing certain advantages such as high availability, data protection, transparent operation, enhanced security, big data analysis, etc. Further aspects are directed to electronic systems and apparatus, processing circuits, computer program products, and so on.

By checking or otherwise determining whether capabilities of a secondary data storage system are different from and/or incompatible with capabilities of a primary data storage system based at least on software or hardware release versions of the respective data storage systems, provisioning data to be replicated on the secondary storage system if any difference and/or incompatibility between the capabilities of the respective data storage systems can be rectified, and preventing, delaying, or otherwise averting the provisioning of the data if the difference and/or incompatibility between the capabilities of the respective data storage systems cannot be rectified, the disclosed systems and methods can advantageously avoid unwanted data storage errors, data corruption, and/or data loss in the replication of data between the respective data storage systems. Such avoidance of unwanted data storage errors, data corruption, and/or data loss can be achieved by the disclosed systems and methods while reducing or substantially eliminating any burden or opportunity for error placed on a user of the disclosed systems and methods.

Other features, functions, and aspects of the invention will be evident from the Detailed Description that follows.

BRIEF DESCRIPTION OF THE DRAWINGS

The foregoing and other aspects, features, and advantages will be apparent from the following description of particular embodiments of the invention, as illustrated in the accompanying drawings in which like reference numerals and characters refer to the same parts throughout the different views.

DETAILED DESCRIPTION

Systems and methods are disclosed for managing a replication of data between data storage resources with differing and/or incompatible capabilities. The disclosed systems and methods can check or otherwise determine whether capabilities of a primary data storage system at a primary storage site are different from and/or incompatible with capabilities of a secondary data storage system at a secondary storage site. Such checking or determining regarding the capabilities of the respective data storage systems can be performed based at least on a software or hardware release version of each of the primary and secondary data storage systems. In the event the capabilities of the respective data storage systems are determined to be different and/or incompatible, the disclosed systems and methods can make a determination as to whether or not the difference and/or incompatibility can be rectified. In the event the difference and/or incompatibility between the capabilities of the respective data storage systems can be rectified, such as by enabling and/or disabling certain features of the primary data storage system and/or the secondary data storage system, the disclosed systems and methods can perform such a rectification and proceed with provisioning of the data to be replicated. In the event the difference and/or incompatibility between the capabilities of the respective data storage systems cannot be rectified, the disclosed systems and methods can prevent, delay, or otherwise avert the provisioning of the data, as well as notify an administrator of the data storage systems such as by providing an error notification.

Figure 1:
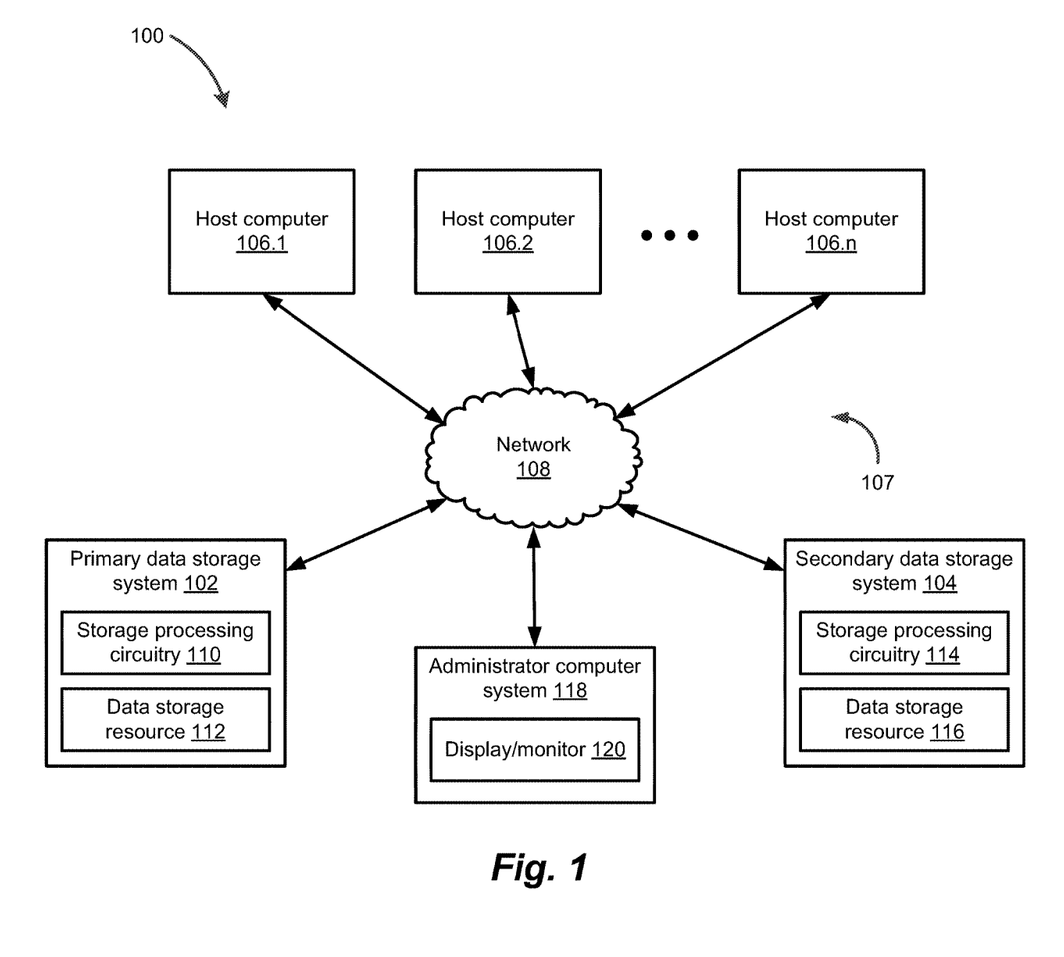
FIG. 1 is a block diagram of a data storage environment that provides for managing a replication of data between an exemplary primary data storage system and an exemplary secondary data storage system with differing and/or incompatible capabilities, in accordance with the present application.

FIG. 1 depicts an illustrative embodiment of an exemplary data storage environment 100 that provides for managing a replication of data between data storage resources with differing and/or incompatible capabilities, in accordance with the present application. As shown in FIG. 1, the data storage environment 100 includes a primary data storage system 102, a secondary data storage system 104, a plurality of host computers 106.1, 106.2, . . . , 106.n, and a communications medium 107 including a network 108. For example, the primary data storage system 102 can be disposed at a primary storage site (also referred to herein as the "production site"), and the secondary data storage system 104 can be disposed at a secondary storage site (also referred to herein as the "replication site"). The primary data storage system 102 can include storage processing circuitry 110, and a data storage resource 112 such as a data storage array. Likewise, the secondary data storage system 104 can include storage processing circuitry 114, and a data storage resource 116 such as a data storage array.

It is noted that the communications medium 107 can be constructed and arranged to connect the various components of the data storage environment 100 together to enable these components to communicate and exchange electronic signals. At least a portion of the communications medium 107 is illustrated as a cloud to indicate that it is capable of having a variety of different topologies including backbone, hub-and-spoke, loop, irregular, combinations thereof, and so on. Along these lines, the communications medium 107 can include copper-based data communications devices and cabling, fiber optic devices and cabling, wireless devices, combinations thereof, etc. Further, the communications medium 107 is capable of supporting SAN-based communications, LAN-based communications, cellular communications, WAN-based communications, distributed infrastructure communications, other topologies, combinations thereof, etc.

In one embodiment, the data storage resource 112 of the primary data storage system 102 and the data storage resource 116 of the secondary data storage system 104 can each be configured to implement object-based or file-based storage. It is noted that data storage systems configured to implement object-based storage typically provide a level of abstraction that allows data of arbitrary size to be specified by an object identifier. Such object-based storage systems can store the data of a storage object in various ranges of a memory address space. Data storage systems configured to implement file-based storage typically specify data locations by a file name, which is used as an identifier for identifying corresponding memory addresses of a storage object. Network file system (NFS) protocols typically rely on such file-based storage systems to translate the file name into the respective memory addresses of the storage object. Like the NFS protocols, object-level protocols rely on object-based storage systems to translate the object identifier into a memory address of a storage object. However, such object-based storage systems generally provide more flexibility than file-based storage systems in that the data of the storage object can be stored within a single file or spread across multiple files.

Figure 2:
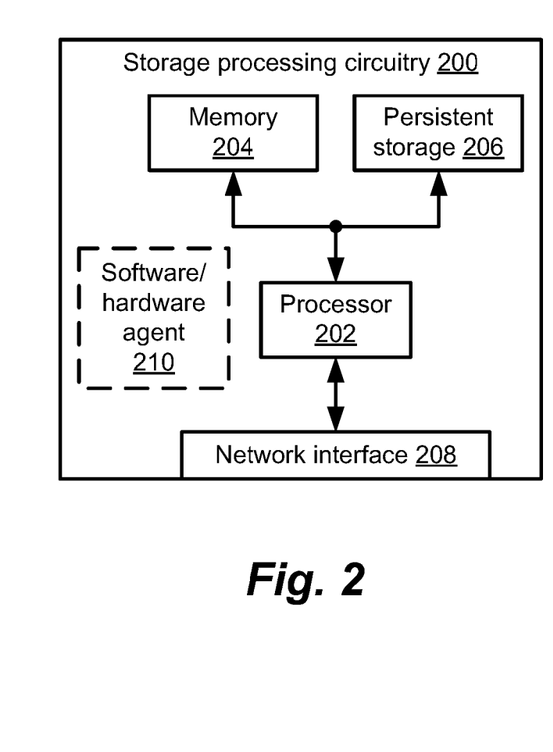
FIG. 2 is a block diagram of storage processing circuitry included in at least the primary data storage system of FIG. 1.

FIG. 2 depicts a detailed view of exemplary storage processing circuitry 200 that can be included in at least the primary data storage system 102 of FIG. 1. It is noted that some or all of the storage processing circuitry 200 of FIG. 2 can also be included in the secondary data storage system 104 of FIG. 1. As shown in FIG. 2, the storage processing circuitry 200 can include at least a processor 202, a memory 204, a persistent storage 206, and a network interface 208. Within the data storage environment 100 of FIG. 1, the primary data storage system 102 disposed at the production site is communicably coupleable, over the network 108 via the network interface 208, to the secondary data storage system 104 disposed at the replication site. The primary data storage system 102 is further communicably coupleable, over the network 108 via the network interface 208, to one or more of the host computers 106.1, 106.2, . . . , 106.n, each of which can be configured to operate as a web server, a file server, an e-mail server, an enterprise server, or any other suitable server or other computer. The network interface 208 can be constructed and arranged to connect the storage processing circuitry 200 to the communications medium 107 (see FIG. 1) to enable communications with other devices of the data storage environment 100. Such communications may be SAN-based, IP-based, cellular-based, cable-based, fiber-optic based, wireless, cloud-based, combinations thereof, and so on. Accordingly, the network interface 208 enables the storage processing circuitry 200 to robustly and reliably communicate with other external apparatus.

As described herein, each of the primary and secondary data storage systems 102, 104 disposed at the production and replication sites, respectively, can be configured to implement object-based or file-based storage. However, the capabilities of the secondary data storage system 104 at the replication site can be different from and/or incompatible with the capabilities of the primary data storage system 102 at the production site. For example, the primary data storage system 102 may have archival data storage features that are not available at the secondary data storage system 104, the secondary data storage system 104 may have a data storage capacity that is less than that of the primary data storage system 102, and/or the primary data storage system 102 may employ data structures that are different from those employed by the secondary data storage system 104. Other differences and/or incompatibilities between the respective data storage systems 102, 104 are also possible. Allowing a replication of data between data storage resources with differing and/or incompatible capabilities can result in unwanted data storage errors, data corruption, and/or data loss.

The primary data storage system 102 disposed at the production site can avoid such unwanted data storage errors, data corruption, and/or data loss by checking or otherwise determining whether its capabilities are different from and/or incompatible with the capabilities of the secondary data storage system 104 at the replication site. The primary data storage system 102 can perform such checking or determining regarding the capabilities of the respective data storage systems 102, 104 at the production site where provisioning of data (e.g., a storage object) to be replicated on the secondary data storage system 104 is to take place. The primary data storage system 102 can make determinations regarding the capabilities of the respective data storage systems 102, 104 based at least on a software or hardware release version of each of the respective data storage systems 102, 104. In the event the primary data storage system 102 determines that the capabilities of the respective data storage systems 102, 104 are different and/or incompatible, the primary data storage system 102 can make a determination as to whether or not such a difference and/or incompatibility can be rectified. In the event the difference and/or incompatibility between the capabilities of the respective data storage systems 102, 104 can be rectified, such as by enabling and/or disabling certain features of at least the primary data storage system 102, the primary data storage system 102 can perform such a rectification of the difference and/or incompatibility and proceed with the provisioning of the data (e.g., the storage object) to be replicated. In the event the difference and/or incompatibility between the capabilities of the respective data storage systems 102, 104 cannot be rectified, the primary data storage system 102 can prevent, delay, or otherwise avert the provisioning of the data (e.g., the storage object), as well as notify an administrator of the data storage systems 102, 104, such as by providing an error notification to a display or monitor 120 (see FIG. 1) of an administrator computer system 118.

In an exemplary mode of operation, the primary data storage system 102 can manage a replication of data between the primary data storage system 102 and the secondary data storage system 104 by performing such a data replication in response to a deficiency at the production site, such as reaching a low free-storage threshold, detecting a failure of an internal component, etc. Responsive to the deficiency at the production site, the primary data storage system 102 can automatically check or otherwise determine whether the capabilities of the secondary data storage system 104 are different from and/or incompatible with the capabilities of the primary data storage system 102 based at least on software or hardware release versions of the respective data storage systems 102, 104. In one embodiment, the software or hardware release version of the primary data storage system 102 can be derived in-flight (e.g., during a pending input/output (I/O) operation) at the production site from one or more attribute metadata of a storage object (e.g., a file, directory, or other data object) to be replicated, and/or from one or more attribute metadata of a parent or child object of the storage object, obviating the need to provide persistence of the software or hardware release version information.

Figure 3:
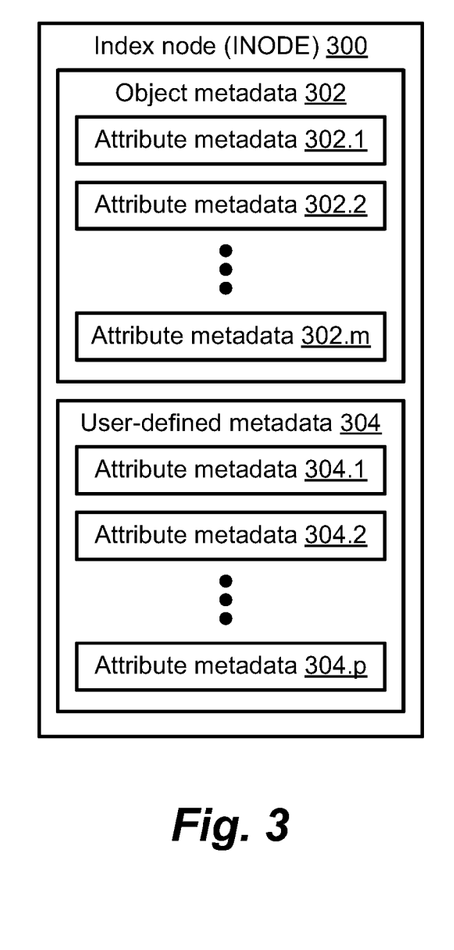
FIG. 3 is a diagram of an exemplary index node (inode) structure of a storage object to be replicated within the data storage environment of FIG. 1.

FIG. 3 depicts an exemplary index node (inode) structure 300 of a storage object to be replicated within the data storage environment 100 of FIG. 1. Such an inode structure 300 can be employed to represent certain attribute metadata pertaining to the storage object to be replicated. As shown in FIG. 3, the inode structure 300 can include object metadata 302.1, 302.2, . . . , 302.m, as well as user-defined metadata 304.1, 304.2, . . . , 304.p. The object and/or user-defined metadata 302.1, 302.m, 304.1, . . . , 304.p can be stored as part of the storage object to be replicated, or separate from the storage object. For example, the object metadata 302.1, 302.2, . . . , 302.m can include information pertaining to the size of the storage object, an object ID, an owner ID, a group ID, inode information and access privileges for at least the owner and the group, one or more protection flags, timestamps for object creation, object modification, object access, etc., a link counter for determining a number of hard links associated with the storage object, one or more pointers associated with blocks storing the storage object's contents, etc., and/or any other suitable object metadata. Further, in one embodiment, the user-defined metadata 304.1, 304.2, . . . , 304.p can include predetermined metadata such as isMigrationDestination, ExportedFSID, EventsPool::VDMId, FileSystem::LockingPolicy, FileSystem::RenamePolicy, FileSystem::CEPPPolicy, DHSMConnections, etc., and/or any other suitable user-defined metadata.

The primary data storage system 102 can access at least the user-defined metadata 304.1, 304.2, . . . , 304.p pertaining to the storage object to be replicated, and use the accessed metadata to derive the software or hardware release version of the primary data storage system 102. For example, such user-defined metadata 304.1, 304.2, . . . , 304.p may be indicative of one or more features of the primary data storage system 102 at the production site that are not available in the software or hardware release version of the secondary data storage system 104 at the replication site. As described herein, in one embodiment, the primary data storage system 102 can derive its software or hardware release version in-flight, e.g., during a pending I/O operation. To that end, the storage processing circuitry 200 within the primary data storage system 102 can further include a software/hardware agent 210 configured to intercept, at the object level, an I/O (e.g., a read/write) associated with a storage object originating from one of the host computers 106.1, 106.2, . . . , 106.n to determine whether the storage object is to be replicated (e.g., in response to a deficiency at the production site). If the storage object is to be replicated, the software/hardware agent 210 can be further configured to derive the software or hardware release version of the primary data storage system 102 from at least the user-defined metadata 304.1, 304.2, . . . , 304.p of the storage object.

Having derived the software or hardware release version of the primary data storage system 102 from at least the user-defined metadata 304.1, 304.2, . . . , 304.p of the storage object to be replicated, the primary data storage system 102 at the production site can obtain the software or hardware release version of the secondary data storage system 104 at the replication site by sending a request for such release version information to the secondary data storage system 104, and receiving, from the secondary data storage system 104, a response containing the requested release version information. In one embodiment, the primary data storage system 102 can initiate such a request and response using a predetermined web application programming interface (API) such as the representational state transfer (REST) API, or any other suitable web API or other technique for retrieving system information. For example, using the REST API, the primary data storage system 102 can obtain the software release version of the secondary data storage system 104 by making a request or query to the basicSystemInfo resource type, and receiving, from the secondary data storage system 104, a response containing an argument, softwareVersion, which is a value indicative of the software release version of the secondary data storage system 104. The value, softwareVersion, comes from the version attribute of the installedSoftwareVersion resource. In one embodiment, the primary data storage system 102 can derive a value of a software release version of the primary data storage system 102 in the same format as the value (e.g., software Version) of the software release version of the secondary data storage system 104, and perform a comparison of the values of the respective software release versions to check or otherwise determine whether its capabilities are different from and/or incompatible with the capabilities of the secondary data storage system 104. In another embodiment, the primary data storage system 102 can also use the REST API to obtain the hardware release version, license information, information about enabled/disabled features, and/or any other suitable system information from the secondary data storage system 104.

Having derived the release version of the primary data storage system 102 and obtained the release version of the secondary data storage system 104, the primary data storage system 102 can make a determination as to whether or not its capabilities are different from or incompatible with the capabilities of the secondary data storage system 104 based at least on the release versions of the respective data storage systems 102, 104. In the event the capabilities of the respective data storage systems are determined to be different or incompatible (e.g., the primary data storage system 102 may have archival data storage features that are not available at the secondary data storage system 104, the secondary data storage system 104 may have a data storage capacity that is less than that of the primary data storage system 102), the primary data storage system 102 can make a further determination as to whether or not such a difference or incompatibility can be rectified. For example, if the difference and/or incompatibility between the capabilities of the respective data storage systems 102, 104 relates to the unavailability of certain archival features at the secondary data storage system 104, then the primary data storage system 102 can disable such archival features at the production site to rectify the difference and/or incompatibility. Further, the primary data storage system 102 can modify, remove, and/or add one or more attribute metadata (e.g., one or more of the user-defined metadata 304.1, 304.2, . . . , 304.p*) pertaining to the storage object to be replicated to reflect the disablement of such archival features. As a result, upon receiving the storage object to be replicated over the network 108 from the primary data storage system 102, the secondary data storage system 104 can correctly interpret the modified attribute metadata of the storage object, and store the storage object in the data storage resource 116 at the replication site while avoiding unwanted data storage errors, data corruption, and/or data loss.

However, if the difference or incompatibility between the capabilities of the respective data storage systems 102, 104 cannot be rectified (e.g., the secondary data storage system 104 may have a data storage capacity that is less than that of the primary data storage system 102), then the primary data storage system 102 can prevent, delay, or otherwise avert the provisioning of the data of the storage object, as well as notify an administrator of the data storage systems 102, 104 such as by providing an error notification. For example, the primary data storage system 102 can send the error notification over the network 108 to the administrator computer system 118 for visual and/or audible notification of the error via at least the display or monitor 120.

Figure 4:
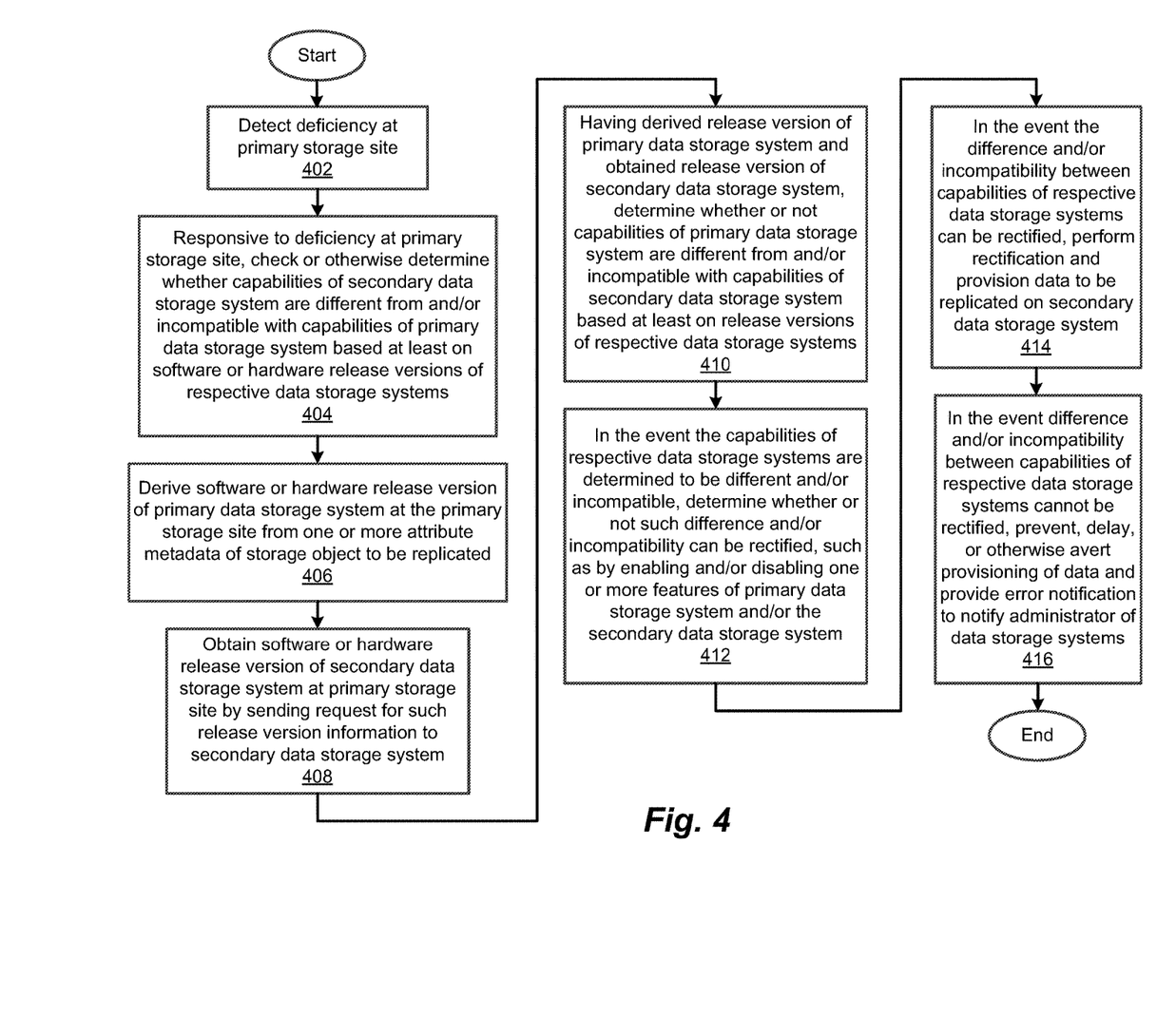
FIG. 4 is a flow diagram of an exemplary method of managing a replication of data between data storage resources with differing and/or incompatible capabilities within the data storage environment of FIG. 1.

An exemplary method of managing a replication of data (e.g., a storage object) between data storage resources with differing and/or incompatible capabilities is described below with reference to FIG. 4, as well as FIG. 1. As shown in block 402 (see FIG. 4), a deficiency is detected at the primary storage site, such as reaching a low free-storage threshold, detecting a failure of an internal component, etc. As depicted in block 404, responsive to the deficiency at the primary storage site, a check or other determination is made as to whether the capabilities of the secondary data storage system 104 (see FIG. 1) are different from and/or incompatible with the capabilities of the primary data storage system 102 based at least on software or hardware release versions of the respective data storage systems 102, 104. As depicted in block 406, the software or hardware release version of the primary data storage system is derived at the primary storage site from one or more attribute metadata of a storage object to be replicated. As depicted in block 408, the software or hardware release version of the secondary data storage system 104 is obtained at the primary storage site by sending a request for such release version information to the secondary data storage system 104.

As depicted in block 410, having derived the release version of the primary data storage system 102 and obtained the release version of the secondary data storage system 104, a determination is made as to whether or not the capabilities of the primary data storage system 102 are different from and/or incompatible with the capabilities of the secondary data storage system 104 based at least on the release versions of the respective data storage systems 102, 104. As depicted in block 412, in the event the capabilities of the respective data storage systems 102, 104 are determined to be different and/or incompatible, a determination is made as to whether or not such a difference and/or incompatibility can be rectified, such as by enabling and/or disabling one or more features of the primary data storage system and/or the secondary data storage system. As depicted in block 414, in the event the difference and/or incompatibility between the capabilities of the respective data storage systems 102, 104 can be rectified, the rectification is performed and the data to be replicated is provisioned on the secondary data storage system 104. As depicted in block 416, in the event the difference and/or incompatibility between the capabilities of the respective data storage systems cannot be rectified, the provisioning of the data is prevented, delayed, or otherwise averted, and an error notification is provided to notify an administrator of the data storage systems.

Having described the foregoing illustrative embodiments, other alternative embodiments and/or variations can be made. For example, it was described herein that the software or hardware release version of the primary data storage system 102 can be derived in-flight at the production site from one or more attribute metadata of a storage object to be replicated, and/or from one or more attribute metadata of a parent or child object of the storage object, obviating the need to provide persistence of the software or hardware release version information. In an alternative embodiment, the software or hardware release version information can be persisted by the primary data storage system 102 in the persistent storage 206 of the storage processing circuitry 200 during the provisioning of the storage object (and/or the parent or child object of the storage object).

It was further described herein that the data storage resource 112 of the primary data storage system 102 and the data storage resource 116 of the secondary data storage system 104 can each be configured to implement object-based or file-based storage. In an alternative embodiment, the data storage resource 110 and the data storage resource 116 can each be further configured to implement block-based storage, in which block-level data transactions can be performed using physical addresses that map directly to the respective data storage resource, and/or logical addresses that can be translated into the physical addresses of the respective data storage resource. In this alternative embodiment, rather than rely on deriving the software or hardware release version of the primary data storage system 102 in-flight at the production site from one or more attribute metadata of a storage object to be replicated, the software or hardware release version can be obtained using a web API or any other suitable technique for retrieving system information.

It was still further described herein that a difference and/or incompatibility between the capabilities of the respective data storage systems 102, 104 can be rectified by enabling and/or disabling certain features of at least the primary data storage system 102. In an alternative embodiment, the primary data storage system 102 and/or the administrator computer system 118 can perform active policing of the capabilities of the primary data storage system 102 and the secondary data storage system 104 to assure that a replication of data between the primary and secondary data storage systems 102, 104 is not allowed at any time when their respective capabilities become different from and/or incompatible with one another.

It was yet further described herein that the capabilities of the secondary data storage system 104 at the replication site can be different from and/or incompatible with the capabilities of the primary data storage system 102 at the production site. In an alternative embodiment, if data replication has already been configured between the primary data storage system 102 and the secondary data storage system 104 for a data storage resource (e.g., the primary data storage system 102 and the secondary data storage system 104 may initially be operating with the same or compatible software/hardware release version(s), and/or may initially have the same or compatible capabilities), then the primary data storage system 102 (or the administrator computer system 118, or any other suitable system) may check or otherwise determine that the primary and secondary data storage systems 102, 104 are operating with the same or compatible software/hardware release version(s), and may therefore prevent an addition of any new capabilities on the primary data storage system 102. In this way, the disclosed systems and methods can avoid incorporating new capabilities into the primary data storage system 102 after data replication between the primary and secondary data storage systems 102, 104 has been configured. If, at a later date, the primary data storage system 102 is upgraded to a new software/hardware release version that provides one or more new capabilities, then the primary data storage system 102 (or any other suitable system) may check or otherwise determine that the primary and secondary data storage systems 102, 104 are now operating with different or incompatible software/hardware release versions, and may therefore prevent, delay, or otherwise avert a provisioning of data to be replicated on the secondary data storage system 104, as well as provide an error notification. Once the secondary data storage system 104 has been upgraded to a new software/hardware release version that is the same as or compatible with the software/hardware release version of the primary data storage system 102, the primary data storage system 102 (or any other suitable system) may check or otherwise determine that the respective software/hardware release versions are now compatible with one another, and may therefore proceed with the provisioning of the data to be replicated on the secondary data storage system 104.

As described herein, improved techniques are directed to managing a replication of data between data storage resources with differing and/or incompatible capabilities. In particular, data is replicated from a production site to a replication site. The operation of the production site can be monitored, and, in response to the detection of a deficiency at the production site (e.g., reaching a low free-storage threshold, failure of an internal component, etc.), automatic checking or other determining is performed with regard to whether the capabilities of a secondary data storage system at the replication site are different from and/or incompatible with the capabilities of a primary data storage system at the production site. Accordingly, there is minimal burden and opportunity for error placed on a user, if any. In addition, the replication of data between the production site and the replication site is not unnecessarily prevented, delayed, or otherwise averted while waiting for a human user to intervene.

It should be appreciated that the above-described systems, methods, and techniques do not merely perform well-known steps that are conventionally performed by a human being. Rather, the disclosed systems, methods, and techniques involve systematic assessments of equipment at computer speeds to electronically evaluate whether the capabilities of a secondary data storage system at a replication site are different from and/or incompatible with the capabilities of a primary data storage system at a production site, and to take appropriate steps based on such an evaluation. Such operations are clearly improvements to data storage system technology, as well as remove the burden and possibility of making a human error from the user.

While various embodiments of the present application have been particularly shown and described, it will be understood by those skilled in the art that various changes in form and details may be made therein without departing from the spirit and scope of the present application, as defined by the appended claims.

For example, it should be understood that various components of the data storage environment 100 such as the host computers 106.1, 106.2, . . . , 106.*n* and other computers and/or computerized devices are capable of being implemented in or "moved to" the cloud, i.e., to remote computer resources distributed over at least one network. The various computer resources can be distributed tightly (e.g., at a server farm in a single facility) or over relatively large distances (e.g., over a campus, in different cities, from coast-to-coast, etc.). In such situations, the network connecting the resources is capable of having a variety of different topologies including backbone, hub-and-spoke, loop, irregular, combinations thereof, and so on. In addition, the network can include copper-based data communications devices and cabling, fiber optic devices and cabling, wireless devices, combinations thereof, etc. Further, the network is capable of supporting SAN-based communications, LAN-based communications, combinations thereof, and so on.

It should further be understood that the systems, methods, and techniques described herein are capable of using existing platforms to carry out the managing of a replication of data between data storage resources with differing and/or incompatible capabilities. That is, there is no need to insert an appliance between the host computers and data storage resources (e.g., as a front-end to the host computers). In addition, such systems, methods, techniques can be performed without the use of virtualization (e.g., no virtual machines or virtualization environment is needed). Accordingly, the host computers are able to enjoy fewer levels of processing that could otherwise impose delays/latency/etc.

The individual features of the various embodiments and implementations described herein can be combined in any desired manner that makes technological sense. Further, the individual features are hereby combined in this manner to form all possible combinations, permutations, and/or variants except to the extent that such combinations, permutations, and/or variants have been explicitly excluded or are impractical. Support for such combinations, permutations and/or variants is considered to exist within the present application. Such modifications and enhancements are intended to belong to various embodiments of the present application.

While various embodiments of the invention have been particularly shown and described, it will be understood by those skilled in the art that various changes in form and details may be made therein without departing from the scope of the invention as defined by the appended claims.

What is claimed is:

1. A computer-implemented method of managing a replication of data between data storage resources with differing capabilities, the data storage resources including a primary data storage resource disposed at a production site and a secondary data storage resource disposed at a replication site, the method comprising:
 detecting a deficiency at the production site;
 responsive to the deficiency at the production site, automatically determining whether one or more capabilities of the secondary data storage resource are different from one or more capabilities of the primary data storage resource;

having determined that the one or more capabilities of the secondary data storage resource are different from the one or more capabilities of the primary data storage resource, determining whether one or more differences in the capabilities of the respective primary and secondary data storage resources can be rectified;

in the event the one or more differences in the capabilities of the respective primary and secondary data storage resources can be rectified, performing a rectification of the one or more differences in the capabilities of the respective primary and secondary data storage resources; and in the event the one or more differences in the capabilities of the respective primary and secondary data storage resources cannot be rectified, preventing a provisioning of data to be replicated on the secondary data storage resource, wherein the determining of whether the one or more capabilities of the secondary data storage resource are different from the one or more capabilities of the primary data storage resource is performed based at least on a first release version of the primary data storage resource and a second release version of the secondary data storage resource.

2. The method of claim 1 wherein the data to be replicated is a storage object, wherein the storage object has one or more associated attribute metadata, and wherein the determining of whether the one or more capabilities of the secondary data storage resource are different from the one or more capabilities of the primary data storage resource includes accessing the one or more attribute metadata associated with the storage object, and deriving the first release version of the primary data storage resource from the one or more attribute metadata associated with the storage object.

3. The method of claim 2 wherein the deriving of the first release version of the primary data storage resource from the one or more attribute metadata associated with the storage object includes intercepting, at an object level, an input/output (I/O) associated with the storage object originating from a host computer to access the one or more attribute metadata associated with the storage object.

4. The method of claim 2 wherein the determining of whether the one or more capabilities of the secondary data storage resource are different from the one or more capabilities of the primary data storage resource further includes sending a request for the second release version to the secondary data storage resource.

5. The method of claim 4 wherein the sending of the request for the second release version includes initiating the request using a predetermined web application programming interface (API).

6. The method of claim 1 further comprising:
performing active policing of the capabilities of the respective primary and secondary data storage resources to assure that the replication of the data between the primary data storage resource and the secondary data storage resource is not allowed at any time when the capabilities of the respective primary and secondary data storage resources become different from or incompatible with one another.

7. A computer-implemented method of managing a replication of data between data storage resources with differing capabilities, the data storage resources including a primary data storage resource disposed at a production site and a secondary data storage resource disposed at a replication site, the method comprising:
detecting a deficiency at the production site;
responsive to the deficiency at the production site, automatically determining whether one or more capabilities of the secondary data storage resource are different from one or more capabilities of the primary data storage resource;

having determined that the one or more capabilities of the secondary data storage resource are different from the one or more capabilities of the primary data storage resource, determining whether one or more differences in the capabilities of the respective primary and secondary data storage resources can be rectified;

in the event the one or more differences in the capabilities of the respective primary and secondary data storage resources can be rectified, performing a rectification of the one or more differences in the capabilities of the respective primary and secondary data storage resources; and in the event the one or more differences in the capabilities of the respective primary and secondary data storage resources cannot be rectified, preventing a provisioning of data to be replicated on the secondary data storage resource, wherein each of the primary data storage resource and the secondary data storage resource includes one or more features, and wherein the performing of the rectification of the one or more differences in the capabilities of the respective primary and secondary data storage resources includes performing one or more of enabling and disabling the one or more features of one or more of the primary data storage resource and the secondary data storage resource.

8. Electronic circuitry, comprising:

a memory; and control circuitry coupled to the memory, the memory storing instructions that, when carried out by the control circuitry, cause the control circuitry to:
detect a deficiency at a production site;
responsive to the deficiency at the production site, automatically determine whether one or more capabilities of a secondary data storage resource disposed at a replication site are different from one or more capabilities of a primary data storage resource disposed at the production site;
having determined that the one or more capabilities of the secondary data storage resource are different from the one or more capabilities of the primary data storage resource, determine whether one or more differences in the capabilities of the respective primary and secondary data storage resources can be rectified;
in the event the one or more differences in the capabilities of the respective primary and secondary data storage resources can be rectified, perform a rectification of the one or more differences in the capabilities of the respective primary and secondary data storage resources; and
in the event the one or more differences in the capabilities of the respective primary and secondary data storage resources cannot be rectified, prevent a provisioning of data to be replicated on the secondary data storage resource,
wherein the instructions, when carried out by the control circuitry, further cause the control circuitry to determine whether the one or more capabilities of the secondary data storage resource are different from the one or more capabilities of the primary data storage resource based at least on a first release version of the primary data storage resource and a second release version of the secondary data storage resource.

9. The electronic circuitry of claim 8 wherein the data to be replicated is a storage object, wherein the storage object has one or more associated attribute metadata, and wherein the instructions, when carried out by the control circuitry, further cause the control circuitry to access the one or more attribute metadata associated with the storage object, and to derive the first release version of the primary data storage resource from the one or more attribute metadata associated with the storage object.

10. The electronic circuitry of claim 9 wherein the instructions, when carried out by the control circuitry, further cause the control circuitry to intercept, at an object level, an input/output (I/O) associated with the storage object originating from a host computer to obtain the one or more attribute metadata associated with the storage object.

11. The electronic circuitry of claim 9 wherein the instructions, when carried out by the control circuitry, further cause the control circuitry to send a request for the second release version to the secondary data storage resource.

12. The electronic circuitry of claim 8 wherein the instructions, when carried out by the control circuitry, further cause the control circuitry to perform active policing of the capabilities of the respective primary and secondary data storage resources to assure that a replication of data between the primary data storage resource and the secondary data storage resource is not allowed at any time when the capabilities of the respective primary and secondary data storage resources become different from or incompatible with one another.

13. Electronic circuitry, comprising:
a memory; and
control circuitry coupled to the memory, the memory storing instructions that, when carried out by the control circuitry, cause the control circuitry to:
detect a deficiency at a production site;
responsive to the deficiency at the production site, automatically determine whether one or more capabilities of a secondary data storage resource disposed at a replication site are different from one or more capabilities of a primary data storage resource disposed at the production site;
having determined that the one or more capabilities of the secondary data storage resource are different from the one or more capabilities of the primary data storage resource, determine whether one or more differences in the capabilities of the respective primary and secondary data storage resources can be rectified;
in the event the one or more differences in the capabilities of the respective primary and secondary data storage resources can be rectified, perform a rectification of the one or more differences in the capabilities of the respective primary and secondary data storage resources; and
in the event the one or more differences in the capabilities of the respective primary and secondary data storage resources cannot be rectified, prevent a provisioning of data to be replicated on the secondary data storage resource,
wherein each of the primary data storage resource and the secondary data storage resource includes one or more features, and wherein the instructions, when carried out by the control circuitry, further cause the control circuitry to perform one or more of enabling and disabling the one or more features of one or more of the primary data storage resource and the secondary data storage resource, while performing the rectification of the one or more differences in the capabilities of the respective primary and secondary data storage resources.

14. A computer program product having a non-transitory computer readable medium that stores a set of instructions to manage a replication of data between data storage resources with differing capabilities, the set of instructions, when carried out by computerized circuitry, causing the computerized circuitry to perform a method of:
detecting a deficiency at a production site;
responsive to the deficiency at the production site, automatically determining whether one or more capabilities of a secondary data storage resource disposed at a replication site are different from one or more capabilities of a primary data storage resource disposed at the production site;
having determined that the one or more capabilities of the secondary data storage resource are different from the one or more capabilities of the primary data storage resource, determining whether one or more differences in the capabilities of the respective primary and secondary data storage resources can be rectified;
in the event the one or more differences in the capabilities of the respective primary and secondary data storage resources can be rectified, performing a rectification of the one or more differences in the capabilities of the respective primary and secondary data storage resources; and
in the event the one or more differences in the capabilities of the respective primary and secondary data storage resources cannot be rectified, preventing a provisioning of data to be replicated on the secondary data storage resource,
wherein the set of instructions, when carried out by the computerized circuitry, further cause the computerized circuitry to determine whether the one or more capabilities of the secondary data storage resource are different from the one or more capabilities of the primary data storage resource based at least on a first release version of the primary data storage resource and a second release version of the secondary data storage resource.

15. The computer program product of claim 14 wherein the data to be replicated is a storage object, wherein the storage object has one or more associated attribute metadata, and wherein the set of instructions, when carried out by the computerized circuitry, further cause the computerized circuitry to access the one or more attribute metadata associated with the storage object, and to derive the first release version of the primary data storage resource from the one or more attribute metadata associated with the storage object.

16. The computer program product of claim 15 wherein the set of instructions, when carried out by the computerized circuitry, further cause the computerized circuitry to intercept, at an object level, an input/output (I/O) associated with the storage object originating from a host computer to obtain the one or more attribute metadata associated with the storage object.

17. The computer program product of claim 14 wherein the set of instructions, when carried out by the computerized circuitry, further cause the computerized circuitry to perform active policing of the capabilities of the respective primary and secondary data storage resources to assure that the replication of the data between the primary data storage resource and the secondary data storage resource is not allowed at any time when the capabilities of the respective primary and secondary data storage resources become different from or incompatible with one another.

\* \* \* \* \*